United States

Walsh

[11] 3,742,095

[45] June 26, 1973

[54] HYDROCYALKYLCARBAMYLALKYL-PHOSPHONATES

[75] Inventor: Edward N. Walsh, New City, N.Y.

[73] Assignee: Stauffer Chemical Company, New York, N.Y.

[22] Filed: July 13, 1970

[21] Appl. No.: 54,579

Related U.S. Application Data

[63] Continuation-in-part of Ser. No. 644,073, June 7, 1967, abandoned.

[52] U.S. Cl. ............. 260/943, 106/15 FP, 106/164, 117/145, 260/2.5 AR, 260/45.95, 260/942, 260/970
[51] Int. Cl. ...... C07f 9/40, C09k 3/28, C08g 22/44
[58] Field of Search ...................... 260/943

[56] References Cited
UNITED STATES PATENTS 3,351,617   11/1967   Jaeger et al..................... 260/943 X
3,381,063   4/1968   Zahir .............................. 260/943 X

OTHER PUBLICATIONS

Gaylord, "Polyethers", Part I, Interscience Publishers, New York (1963), p. 107.

*Primary Examiner*—Lewis Gotts
*Assistant Examiner*—Anton H. Sutto
*Attorney*—Wayne C. Jaeschke, Paul J. Juettner and Martin Goldwasser

[57] ABSTRACT

The compounds described herein are hydroxyalkylcarbamylalkylphosphonates which are useful in preparing flame resistant polymer compositions. Exemplary of these compounds are bis-(hydroxyethyl) bis-(hydroxyethyl)carbamylethylphosphonate and diethyl bis-(hydroxyethyl)carbamylmethylphosphonate.

7 Claims, No Drawings

HYDROCYALKYLCARBAMYLALKYLPHOSPHONATES

This application is a continuation-in-part of Ser. No. 644,073, filed June 7, 1967, now abandoned.

This present invention relates to novel hydroxyalkylcarbamylalkylphosphonates and to copolymers which can be made therefrom.

In one embodiment, this invention relates to certain hydroxyalkylcarbamylalkylphosphonates which can be copolymerized with isocyanates to render the resulting compositions flame resistant. The resulting flame-resistant compositions can be used in the form of expanded foam products as thermal insulation. By using the technique of foaming-in-place, such insulation can be used in the manufacture of refrigerators and aircraft components wherein such foams add strength as well as flame resistance to the components.

The problem of increasing the flame resistance of polymers, particularly polyurethane, is a known problem and various additives have been brought forth providing such increased flame resistance. As with any additive to a chemical composition, there exists along with the ability to perform its desired function certain characteristics of the compound which make it unadaptable for use in all instances.

In the past, phosphonates have been disclosed as having utility as flameproofing agents for polymeric materials. Reference is made to Speziale U.S. Pat. No. 3,066,140 dated Nov. 27, 1962 which teaches that dialkyl, N,N-dialkylcarbamylmethylphosphonates are useful for this purpose. However, these compounds are inert additives in that they do not have any reactive groups which would permit the compound to be chemically bound to the polymer chain. As such, these compounds have the tendnncy to migrate to the surface of a formed article thereby reducing their overall effectiveness as a flame-retardant. Further, the polymer product is somewhat weakened due to the presence of the interspersed additive.

Beck et al., U.S. Pat. No. 3,076,010 dated Jan. 29, 1963 also teaches that phosphonates are useful as flame-retardant materials. Specifically, Beck et al. teaches that dialkyl N,N-dialkanolaminoalkylphosphonates are effective fire-retardant compounds for polyurethane resins. The compounds of Beck et al. provide the particular advantage of having reactive functionality so that the compounds can be chemically bound to the polymer chain. This bonding provides a more uniform distribution of the fire-retardant within the polymer and prevents the migration of the retardant to the surface of the polymer.

The compouds of Beck et al. also provide a further advantageous feature in that the compounds are weakly basic and provide a catalytic effect for the polyurethane polymerization reaction. Because of this effect, rapid curing rates, e.g., 2 – 3 minutes, are attained which is desirable for on the spot foam formation. As is obvious, premixing is negated and therefore the reactants must be admixed in a mixing nozzle which meters each reactant in proper proportion into the stream.

While the above property of fast curing is desirable in some instances, it is not desirable in all. The catalytic activity precludes premix preparations which are desired by some formulators who do not wish to handle and measure out all the reactants necessary to provide a final polymer product.

The present invention overcomes these problems by providing a phosphonate compound for use as a flame-retardant additive for polyurethane polymers which compound is neutral, which has no catalytic effect on the urethane reaction and which has reactive functionality so that the compounds can be chemically bound to the polymer chain.

In accordance with the present invention, there is provided new and novel hydroxyalkylcarbamylalkylphosphonates which are useful as flame retardants for polymers, particularly polyurethanes. Unexpectedly, it has also been found that these compounds can be used as effective flame retardants for cellulosics and modified celluloses.

The new compounds of this invention are represented by the formula:

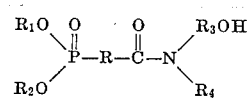

wherein R is a divalent saturated carbon linking chain having from one to four carbon atoms in the chain, $R_1$ and $R_2$ can be alkyl, haloalkly and hydroxyalkyl, $R_3$ is an aliphatic divalent hydrocarbon alkylene radical of from two to 10 carbon atoms and being at least ethylene and $R_4$ can be hydrogen, alkyl, haloalkyl and hydroxyalkyl. The carbon radical R can be specifically illustrated by the formula:

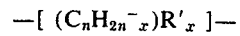

wherein $n$ is a number from 1 to 4, $x$ is a number from 0 to $2n$, and R' can be the same or various and distinct organic radicals equal in number to $x$ such as alkyl, haloalkyl, aryl, aralkyl and

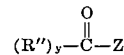

wherein R'' can be an aliphatic divalent hydrocarbon radical of up to 10 carbon atoms, $y$ is a number from 0 to 1, and Z can be hydroxy, alkoxy, haloalkoxy, amido, hydroxyalkylamido and the like. Preferably, $R_4$ is hydroxyalkyl and more preferably $R_1$ and $R_2$ are hydroxyalkyl.

These new compounds can be made by reacting the corresponding mono- or di- carboxylic acid esters of phosphonic acid with primary alkanol amines or secondary mono- or di- alkanol amines. Monocarboxylic acid esters of phosphonic acid can be easily prepared by known methods. Illustrative of these known methods is the Arbuzov method of reacting a trialkyl phosphite with a halocarboxylic acid ester according to the following reaction:

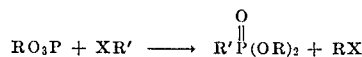

wherein R is alkyl, R' is a carboxylic acid ester moiety and X is a halogen anion.

Illustrative trialkyl phosphites for use in preparation of carboxylic acid esters for the purposes of this invention by the Arbuzov method are trimethyl phosphite, triethyl phosphite, tripropyl phosphite, tributyl phosphite, tripentyl phosphite, trioctyl phosphite, methyl diethyl phosphite, trichloroethyl phosphite, tribromoethyl phosphite, trimethoxyethyl phosphite, tribenzyl phosphite, tricyclohexyl phosphite, triallyl phosphite, and the like. Halocarboxylic acid esters for use in the Arbuzov method are illustrated by methyl chloroacetate, ethyl chloroacetate, propyl chloroacetate, ethyl bromoacetate, methyl chloropropionate, ethyl chlorobutanoate, and the like. The monocarboxylic acid esters of phosphonic acid can also be prepared by the Michaels-type addition reaction of a dialkyl phosphite with an α,β-ethylenically unsaturated material in the presence of sodium metal catalyst as illustrated in the following general reaction:

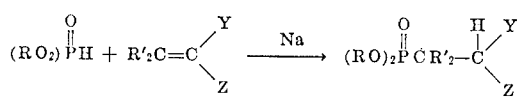

wherein R is alkyl or hydroxyalkyl and R' is hydrogen or lower alkyl, Y is generally hydrogen and Z is a carboxylic acid ester radical. Dialkyl phosphites for use in the Michaels reaction are illustrated by dimethyl, diethyl, diisopropyl, dibutyl, di-hexyl, di-octyl, dihydroxyethyl, dihydroxypropyl, dichloroethyl, dibromoethyl, dimethoxyethyl, dibenzyl, diallyl and the like, and α,β-ethylenically unsaturated materials illustrated by methyl acrylate, ethyl acrylate, butyl acrylate, methyl methacrylate, ethyl methacrylate and the like.

Representative examples of monocarboxylic acid esters of phosphonic acid which are useable to form the compounds of the present invention are:

dimethyl carbomethoxymethylphosphonate;
diethyl carbomethoxymethylphosphonate;
bis-(chloroethyl) carbomethoxymethylphosphonate;
diethyl carbethoxymethylphosphonate;
bis-(hydroxyethyl) carbethoxyethylphosphonate;
diethyl carbomethoxyethylphosphonate;
bis-(hydroxypropyl) carbethoxyethylphosphonate;
bis-(methoxyethyl) carbethoxymethylphosphonate;
methyl ethyl carbethoxyethylphosphonate;
dibenzyl carbomethoxymethylphosphonate;

and the like. These materials are given as illustrative and are in no way intended to be inclusive of all the possible monocarboxylic acid esters of phosphonic acid which are useable to form the compounds of the present invention.

The dicarboxylic acid esters of phosphonic acid are also useful in preparing the compounds of the present invention and can be easily formed by reacting a dialkyl phosphite such as listed above with an ester of an ethylenically unsaturated dicarboxylic acid, such as maleic acid, fumaric acid, itaconic acid, citraconic, glutaconic acid and the like, in the presence of a catalyst such as sodium ethoxide as per the following general reaction scheme:

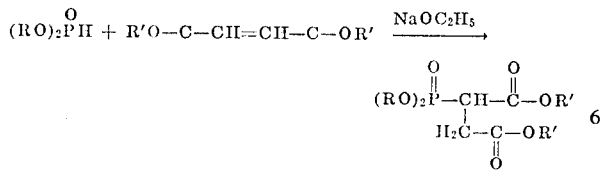

wherein R and R' are generally alkyl or hydroxyalkyl. The above general reaction can also be accomplished with the isomers of the diacid compounds shown and also its homologues and is given by way of general illustration. Further information on the preparation of dicarboxylic acid esters of phosphonic acid can be seen in U.S. Pat. Nos. 2,668,800 and 2,754,320.

Illustrative examples of the dicarboxylic acid ester phosphonates which can be used to form compounds within the scope of the present invention are (names based on dicarboxylic acid for simplicity):

dimethyl 2-(dimethyl phosphono)succinate;
diethyl 2-(dimethyl phosphono)succinate;
diethyl 2-(diethyl phosphono)succinate;
diethyl 2-methyl-2-(diethyl phosphono)succinate;
dimethyl 2-(diethyl phosphono)succinate, and the like. These are given as illustrative and are in no way intended to be inclusive of all dicarboxylic acid ester phosphonates which can be used to form the compounds of the present invention.

The carboxylic acid esters of phosphonic acid are reacted with a primary alkanol amine or a secondary mono- or di-alkanol amine to form the compounds of the present invention. Primary alkanol amines can be illustrated by ethanol amine, propanol amine, butanol amine and the like. Secondary monoalkanolamines can be illustrated by N-methyl aminoethanol, N-ethyl aminoethanol, N-methyl aminopropanol, N-ethyl aminopropanol, N-methyl aminobutanol, N-chloroethyl aminoethanol. Dialkanolamines can be illustrated by diethanolamine, dipropanolamine, ethanol, propanolamine, dibutanolamine, dioctanolamine and the like. These are given as illustrative and are in no way intended to be inclusive of all alkanol amines which can be used to form the compounds of the present invention.

The reaction between the alkanol amine and the carboxylic acid ester of phosphonic acid is promoted by slightly elevated temperatures. Temperatures within the range of 50° – 150° C. are effective to promote substantially complete conversion of the reactants to the desired reaction product. While the reaction proceeds at a rapid rate, the reactants are preferably subjected to elevated temperature for about 1 hour to insure completeness of reaction.

The alkanol amine is preferably used in sufficient quantity to effect replacement of each ester group attached to the carboxylic acid moiety of the phosphonate. Thus, equimolar quantities of alkanol amine are preferred for reaction with the monocarboxylic acid phosphonate and twice the molar amount for reaction with the dicarboxylic acid phosphonate. Partial amidation of the dicarboxylic acid phosphonate can be effected by using a molar quantity of alkanol amine less than that necessary for full replacement of ester groups.

Representative examples of the novel phosphonate compounds of the present invention include the following:

dimethyl bis-(hydroxyethyl)carbamylmethylphosphonate;
diethyl bis-(hydroxyethyl)carbamylethylphosphonate;
dimethyl bis-(hydroxyethyl)carbamylmethylphosphonate;
bis-(hydroxyethyl) bis-(hydroxyethyl)carbamylmethylphosphonate;
N,N'-bis-(hydroxyethyl) 2-(diethyl phosphono)succinamide;
N,N,N',N'-tetrakis-(hydroxyethyl) 2-(diethyl phosphono)succinamide;

methyl N,N-bis-(hydroxyethyl) 2-(dimethyl phosphono)succinamate;

N,N'-bis-(hydroxyethyl) 2-(dimethyl phosphono)succinamide;

N,N'-bis-(hydroxyethyl) N,N'-dimethyl 2-(dimethyl phosphono)succinamide;

N,N,N',N'-tetrakis-(hydroxyethyl) 2-methyl-2-(diethyl phosphono)succinamide;

These are given as illustrative of the various compounds included within the scope of the present invention.

An outstanding use for these new phosphonate compounds is in providing flame resistance for polyurethane foam formulations. The phosphonates can be used individually or in various mixtures to provide excellent flame resistance. Because of the presence of the hydroxyl groups in the hydroxyalkylcarbamyl portion of the molecule, these compounds react with the isocyanates in the urethane foam formulation to produce flame resistance copolymers, and they may replace some or all of the polyol generally used in such formulations. Also, additional hydroxy-functionality can be present on the phosphonate ester portion of the molecule in the form of hydroxyalkyl phosphonic acid ester groups which functionality can be effectively utilized for satisfying the polyol requirements of a urethane formulation.

The production of urethane or isocyanate polymers is a well known commercial process, see for instance Kirk-Othmer, The Encyclopedia of Chemical Technology, First Supplement, pages 888 et seq., (Interscience 1957). Briefly, this process involves the reaction of a polyisocyanate and a second polyfunctional compound which may contain an hydroxyl, amino or carboxy group, i.e., a polyfunctional compound containing active hydrogens. As used in this specification the term "isocyanate or isocyanate material" is intended to include isocyanate or urethane compositions containing unreacted —NCO radicals.

The most common polymers are formed by the reaction of toluene diisocyanate (hereafter designated TDI) and a polyester prepolymer. Representative polyesters are the reaction products of adipic acid and/or phthalic anhydride and ethylene glycol. Other compounds which may be used in place of the polyesters are polyethers, simple glycols, polyglycols, castor oil, drying oils, etc. Whether the products are to be flexible or rigid depends upon the degree of cross-linking and thus the type of polyol which is used. The products of the present invention are useable in either flexible or rigid foams and can replace all or part of the polyol used.

When an expanded or foamed product is to be produced, it is the general practice to add water to the composition. The water reacts with the —NCO groups to release $CO_2$ and cause the expansion of the polymer into a foamed mass.

Control of the foaming reaction requires considerable skill and often special equipment. In some cases it has been found advisable to use inert dissolved gases including the various halohydrocarbons such as the well known Freons or Genetrons (halogen substituted hydrocarbons). These low boiling liquids are released when warmed by the heat of reaction and thus cause foaming. They also serve to lower the thermal conductivity and increase the flame resistance of the resulting foam. The term "foaming agent" as used herein is intended to include both reactive materials such as water and inert materials such as halohydrocarbons which cause the copolymers to form an expanded foam.

In addition to the actual reactants and foaming agents, it is also desirable in many cases to add a small amount of a surfactant in order to provide a more homogeneous mixture.

The reaction between the isocyanate and the polyol is ordinarily conducted in the presence of a catalyst for effective product formation. Compounds which exhibit a basic pH, such as amines, are generally utilized for this purpose. Additives, such as fire-retardants which are basic, can also provide this catalytic function. Therefore, selection of additives to be included in a polymer reaction mixture must be done judiciously to avoid undesirable side effects such as premature polymerization, especially during the preparation of the polymer reaction mixture.

The compounds of the present invention are neutral and do not have any catalytic activity toward the urethane reaction. Urethane reaction mixtures containing the compounds of the present invention and which lack the normal basic catalyst can be prepared which are stable for a period of time up to three months. This stability is of particular utility in that the fire-retardant can be intimately blended within the urethane polymer reaction mixture without fear of premature polymerization. The use of basic additives, especially in the field of on the spot foaming, requires complicated, expensive, on the spot mixing equipment so as to avoid premature polymerization caused by the catalytic nature of the additive. Because the compounds of the present invention are substantially neutral and do not exhibit any catalytic effect toward the urethane reaction, they are adaptable for the formulation of premixes or large volume batches which are not required to be used immediately. This obviates the need for the complex mixing equipment presently necessary in using a basic additive material.

The invention is illustrated in the examples which follow:

EXAMPLE 1

Preparation of 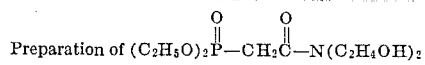

A mixture of 21.9 grams (0.2 mole) of diethanol amine and 44.9 grams (0.20 mole) of diethyl carbethoxymethyl-phosphonate was heated in a reaction flask to 120° C. for 1 hour. The reaction mixture was then concentrated by distilling off volatiles at 100° C. under vacuum (1.0 millimeter of mercury pressure). The resulting diethyl bis-(hydroxyethyl) carbamylmethylphosphonate was a viscous material which analyzed as 10.5% phosphorus (theory 10.2percent).

EXAMPLE 2

Preparation of 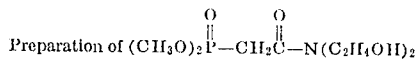

A mixture of 66.0 grams (0.3 mole) of diethyl carbomethoxymethylphosphonate and 31.5 grams (0.3 mole) of diethanol amine was reacted according to the method of Example 1 to yield 87.8 grams of diethyl bis-(hydroxyethyl)carbamylmethylphosphonate which analyzed as 10.5 percent phosphorus (theory 10.2 percent).

EXAMPLE 3

A mixture of 91.0 grams (0.5 mole) of dimethyl carbomethoxymethylphosphonate and 52.5 grams (0.5 mole) of diethanol amine was reacted according to the procedure of Example 1. The resulting dimethyl bis-(hydroxyethyl)carbamylmethylphosphonate analyzed as 16.9% phosphorus (theory 16.9 percent).

EXAMPLE 4

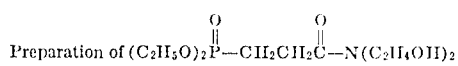

Preparation of $(C_2H_5O)_2\overset{O}{\overset{\|}{P}}-CH_2CH_2\overset{O}{\overset{\|}{C}}-N(C_2H_4OH)_2$ In a flask was placed 89.6 grams (0.4 mole) of diethyl carbomethoxyethylphosphonate and 42.0 grams (0.4 mole) of diethanol amine. The mixture was heated to 80° – 100° C. and held at that temperature for 1 hour. The reaction mixture was then placed under vacuum (about 1 millimeter of mercury pressure) for approximately 3½ hours at about 100° C. There was obtained 118.8 grams of diethyl bis-(hydroxyethyl)carbamylethylphosphonate which analyzed as 10.0% phosphorus (theory 10.4 percent).

EXAMPLE 5

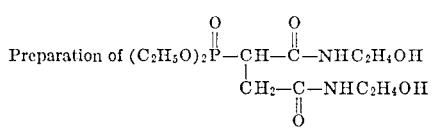

The above compound was prepared by placing a mixture of 141.0 grams (0.5 mole) of

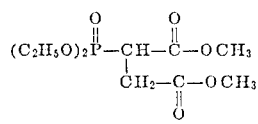

[dimethyl 2-(diethyl phosphono)succinate] and 61.0 grams (1.0 mole) ethanol amine in a reaction vessel and heating the mixture gradually to 100° C. A vacuum was applied to the reaction vessel to strip the methanol until a pressure of 1.0 millimeter of mercury was attained. The reaction yielded 163.0 grams of N,N'-bis-(hydroxyethyl) 2-(diethyl phosphono)succinamide (95.5 percent of theoretical) which analyzed as 8.9% phosphorus (theory 9.1 percent).

EXAMPLE 6

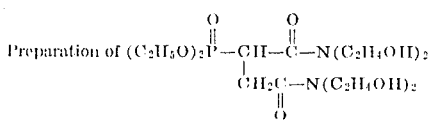

The procedure of Example 5 was repeated, using 105.0 grams (1.0 mole) of diethanol amine in place of the ethanol amine. The resulting N,N,N',N'-tetrakis-(hydroxyethyl) 2-(diethyl phosphono)succinamide analyzed as 6.7% phosphorus (theory 7.2 percent) and 15.0% OH (theory 15.8 percent).

EXAMPLE 7

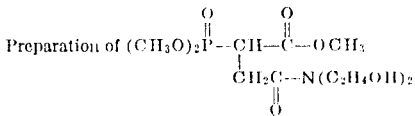

A mixture of 76.2 grams of dimethyl 2-(dimethyl phosphono)succinate and 31.5 grams of diethanol amine was heated in a reaction vessel to 80° C. A vacuum was applied to the mixture for about 1 hour while maintaining the temperature at about 80° C. to strip off methanol. The resulting methyl N,N-bis-(hydroxyethyl) 2-(dimethyl phosphono)succinamate analyzed as 8.8% phosphorus (theory 9.7 percent).

EXAMPLE 8

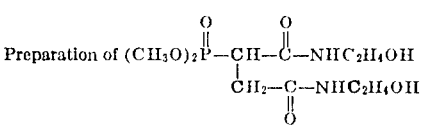

The above material was prepared by reacting 76.2 grams (0.3 mole) of dimethyl 2-(dimethyl phosphono)-succinate with 36.6 grams (0.6 mole) of ethanol amine in the manner set forth in Example 5 to provide 90.7 grams of N,N'-bis-(hydroxyethyl) 2-(dimethyl phosphono)succinamide (97 percent of theoretical yield) which analyzed as 10.1% phosphorus (theory 9.95 percent).

EXAMPLE 9

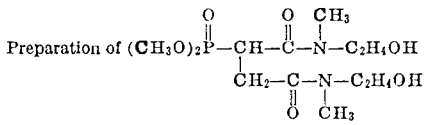

The above material was prepared by reacting 76.2 grams (0.3 mole) of dimethyl 2-(dimethyl phosphono)-succinate with 45.0 grams (0.6 mole) of N-methylaminoethanol in the manner set forth in Example 5 to provide 102.0 grams of N,N'-bis-(hydroxyethyl) N,N'-dimethyl 2-(dimethyl phosphono)succinamide, (100 percent of theoretical) which analyzed as 9.7% phosphorus (theory 9.3 percent).

EXAMPLE 10

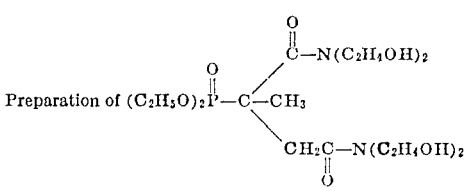

The above compound was prepared by mixing 71.4 grams (0.2 mole) of $(C_2H_5O)_2\overset{O}{\overset{\|}{P}}-\overset{\diagup C-OC_2H_5}{\underset{\diagdown CH_2C-OC_2H_5}{\overset{\|}{\underset{O}{}}}}CH_3$ and 42 grams (0.4 mole) of diethanolamine in a reaction vessel and heating the same for two hours at 100° C. The reaction mixture was then placed under vacuum for 2 hours at 100° C. The vacuum was maintained to strip off volatiles until a stable pressure of 1.0 millimeter of mercury at 100° C. was attained. The process yielded 87.0 grams of N,N,N',N'-tetrakis-(hydroxyethyl) 2-methyl-2-(diethyl phosphono)succinamide and analyzed as 7.3% phosphorus (theory 7.2 percent).

EXAMPLE 11

Preparation of 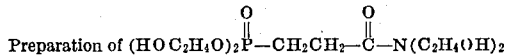

The above compound is prepared by following the procedure set forth in Example 4 using 102.4 grams (0.4 mole) of bis-(hydroxyethyl) carbomethoxyethylphosphonate and 42 grams (0.4 mole) of diethanol amine. Other hydroxyalkyl carbamylalkylphosphonates can be prepared in accordance with the procedure of this example by the utilization of other hydroxyalkyl phosphonates such as bis-(hydroxypropyl carbomethoxymethylphosphonate, bis-(hydroxypropyl) carbomethoxyethylphosphonate, bis-(hydroxyethyl) carbethoxymethylphosphonate, methyl hydroxyethyl carbomethoxyethylphosphonate and the like in equimolar quantities in place of the bis-(hydroxyethyl) carbomethoxyethylphosphonate in approximate equimolar quantities. Also, the substituents on the amidonitrogen atom can be varied by the use of equimolar quantities of alkanol amines other than diethanolamine, such as N-methylaminoethanol, N-ethylaminopropanol and the like, dipropanolamine, ethanolpropanolamine and the like.

The preceding examples have illustrated the preparation of the fire-retardant compounds of the invention. The following examples will illustrate their use in the production of polyurethane foam material.

EXAMPLE 12

A polyurethane foam was made by admixing the following material in a container and allowing the material to expand:

10.9 grams of diethyl bis-(hydroxyethyl)carbamylmethylphosphonate

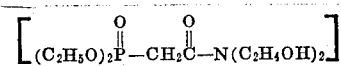

13.0 grams trichlorofluoromethane
0.5 gram silicone surfactant
0.2 gram tin catalyst
0.5 gram tetramethyl guanadine
28.8 grams of a propylene oxide-sucrose based polyol having an equivalent weight of approximately 121 and a hydroxyl number of approximately 464.
46.3 grams of a polymethylene polyphenylisocyanate having an average viscosity of 250 centipoises at 25° C., and average of 31% NCO content, an isocyanate equivalent of 133.5, and a formula of:

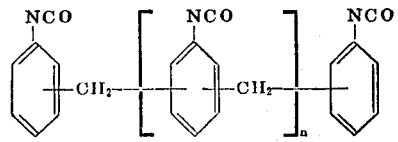

wherein $n$ is about 2.6.

The foam rose rapidly and exhibited good fire-resistant properties. A small piece of this foam burned slowly when held in the flame of a Bunsen burner and was immediately self-extinguishing when removed from the flame.

EXAMPLE 13

A foam exhibiting similar results was prepared in the same manner as set forth in Example 12 using the compound of Example 8 using the following proportions of materials.

15.3 grams of diethyl bis-(hydroxyethyl)carbamylethylphosphonate

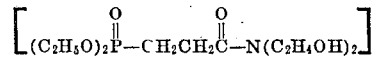

13.0 grams trichlorofluoromethane;
0.5 gram silicone surfactant;
0.2 gram tin catalyst;
0.5 gram tetramethyl guanadine;
25.2 grams of a propylene oxide-sucrose based polyol having an equivalent weight of 121 and an hydroxyl number of 464;
27.3 grams of the polyisocyanate described in Example 12.

A control sample of polyurethane foam was prepared in the same manner as shown in Example 17 with the exception that no phosphonate fire-retardant compound was included in the formulation. A small piece of this polyurethane foam was suspended vertically and ignited with a Bunsen burner. The phosphonate-free foam ignited readily and burned completely in 35 seconds.

Polyurethane foams can also be prepared showing similar fire-retardant qualities utilizing the compounds described in Examples 1 – 11, as well as any of the other compounds which fall within the generic description of the compounds disclosed herein.

The exact proportions of reactants necessary to produce the flame resistant copolymers are not too critical. Stoichiometric quantities can be readily calculated from the hydroxyl number of the polyol (or the amount of active hydrogen in the case of amino or carboxy groups) and the number of —NCO groups in the isocyanate. Generally speaking, however, the isocyanate is used in an excess of 5 – 15 percent of the stoichiometric amount required.

It has been found desirable to form a prepolymer by first reacting the isocyanate with sufficient polyester or polyol to reduce the amount of remaining isocyanate groups to about 30 percent to 35 percent, by weight, of the prepolymer. Since the isocyanate has a normal isocyanate group content of about 32 percent, the formation of the prepolymer results in reducing the —NCO content by about 25 percent. This is primarily a process expedient, however, and is not necessary to the practice of the invention.

It has also been found that the compounds of the present invention are effective in flame proofing or providing flame retardant textiles. Particularly, it has been found that cellulosics such as wood fiber, wool and cotton can be made flame retardant with the compounds of the present invention. Preferably the flame retardant is used in combination with an aminoplast resin and preferably with a latent acid catalyst. The aminoplast resins which can be used include the condensation product of formaldehyde with urea or a derivative thereof such as ethyleneurea, or melamine or a derivative, such as an ether, thereof. The latent acid catalysts which can be used are well known and include ammonium chloride, ammonium dihydrogen, orthophosphate, magnesium chloride, and zinc nitrate. The aminoplast resin treated cellulosic textile is usually heat treated to cure the aminoplast resin composition to form an adherent coating on the textile fiber. The following examples illustrate the use of the compounds of the invention in the production of flame retardant textiles.

EXAMPLE 14

The product of Example 1, diethyl bis-(hydroxy ethyl) carbamylmethylphosphonate, was applied to cotton print cloth (3.2 oz/yd$^2$) in combination with various aminoplast resins. The flame retardant was admixed with the aminoplast resin and padded twice onto the cotton cloth. The treated cotton cloth was dried for 5 minutes at 110°C. and cured for 5 minutes at 163°C. Samples were prepared using the following proportions of materials.

TABLE I

| Sample number | Padding solution (percent solids in aqueous solution) | | | | | |
|---|---|---|---|---|---|---|
| | Product of Example 1 | Aminoplast resin | Catalyst (buffered zinc nitrate) | Wetting agent (Triton X-100) | pH of solution | Percent added on [1] |
| 1 | | | | | | |
| 2 | 30 | 12(A) | 1 | 0.4 | 5.35 | 29.9 |
| 3 | 30 | 12(A) | 1 | 0.4 | [2] 5.0 | 27.6 |
| 4 | 30 | 12(B) | 1 | 0.4 | 4.58 | 32.7 |
| 5 | 30 | 12(C) | 1 | 0.4 | 5.50 | 24.7 |

[1] Based on weight of untreated fabric.
[2] Adjusted with HCl.
A = Permafresh 183 (a dihydroxy dimethylol ethylene urea).
B = Aerotex 23 Special (a penta-substituted (methoxy methyl) hydroxy methyl melamine).
C = Aerotex M-3 (a tris (methoxy methyl) melamine).

The fire retardancy of these samples was then quantitatively evaluated both before and after washing by determining their Limiting Oxygen Index (LOI) by means of the procedure described by Fenimore and Martin in the November, 1966 issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = [O_2]/([O_2] + [N_2]) \times 100$$

Thus, a higher LOI is indicative of a higher degree of flame retardancy.

The following table presents the results of this evaluation.

TABLE II

| SAMPLE | LIMITING OXYGEN INDEX (L.O.I.) (% Oxygen) | |
|---|---|---|
| | Before Washing | After 5 Detergent Washes |
| 1 | 18-19 | 18-19 |
| 2 | 29 | 24.7 |
| 3 | 29 | 23.4 |
| 4 | 32 | 27.3 |
| 5 | 30.6 | 26.1 |

The above Table II clearly demonstrates that the product of Example 10 when applied to textiles in combination with an aminoplast resin imparts good initial flame retardancy as particularly evidenced by the increase in the L.O.I. from 18-19 to at least 29. Part of the fabric finish is removed by washing but the L.O.I. data indicates that an appreciable and effective amount of flame retardant still remains on the fabric. If the finish were enitrely removed, the L. O. I. would approach that of the untreated smaple, (Sample 1.). The results also indicate that flame retardance is dependent on the amount of the flame retardant which has been added onto the fabric. As the amount of flame retardant increases, so does the flame retardancy. Thus, control of flame retardancy can be affected by control of the amount applied to the textile. The hand of the samples remained good for all samples.

The foregoing examples illustrate the utility of the compounds of the present invention as flame retardants for cotton textile fabrics. Similar results can be obtained using other textile fabrics prepared from both natural and synthetic fibers such as cellulosics which include wood fiber, paper and wool as well as the aforementioned cotton; modified celluloses such as cellulose acetate and rayon; polyamides (nylons); polyesters, particularly unsaturated polyesters; and acrylonitriles.

Effective flame retardancy is also experienced in other polymer shapes such as sheet, rod, film and extruded shapes using many of the known polymer systems. These include those enumerated above as well as the vinyls such as polyvinyl chloride; polyvinyl alcohol; acetals such as polyvinyl butyrals; acrylates and methacrylates including polymers of the esters anhydrides, acid halides (Cl and Br), alkali metal salts (Group I), amides and nitriles of acrylic and methacrylic acid and particularly methyl methacrylate; polyphenylene oxide, natural and synthetic rubber, epoxy polymers, polyolefins such as polyethylene and polypropylene; phenolics, polyethers, vinyl ethers as well as the styrenes and halostyrenes. The compounds of the invention are effective in forming flame retardant polymer compositions in loadings from about 5 to about 40 percent, by weight. The amount used will vary slightly depending on the polymer system and whether or not the flame retardant is blended into the polymer or applied to the surface. These amounts can be easily determined by one skilled in the art.

For the purpose of flameproofing copolymers in accordance with the present invention, it is found that it is necessary to add at least about 0.7% phosphorus and preferably about 4% phosphorus in the form of the compounds of the present invention, said percentage being based on the total weight of the copolymer. For the purposes of surface flame retardant use, from about 0.5 percent to about 2 percent and preferably from about 0.7 percent to about 1.5 percent has been found to be effective. These percentages may be easily calculated from the physical constants of the materials involved.

In performing the foregoing examples, ordinary commercial grade materials have been used, with the exception of the new compounds disclosed herein. These commercial compounds are readily available in most instances.

Also, other additives may be included in the polymer compositions as used in the present invention such as pigments, dyes, fillers, curing agents and the like as is well known in the polymer art. The flame retardant effect of the compounds of the present invention is not diminished by the addition of these materials.

Thus, and in accordance with the present invention, new and novel compounds are provided which are effective flame retardant materials for polymers and particularly for polyurethane resins which allow the utilization of these materials in polymer premixes and also as fire retardants on cellulosics and modified cellulosics.

The invention is defined in the claims which follow.

What is claimed is:

1. Hydroxyalkylcarbamylalkylphosphonates of the formula:

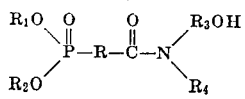

wherein R is a divalent saturated carbon linking chain having from one to four carbon atoms in said chain; $R_1$ and $R_2$ are radicals independently selected from the group consisting of alkyl, haloalkyl and hydroxyalkyl; $R_3$ is an aliphatic hydrocarbon alkylene radical having from two to 10 carbon atoms and being at least ethylene; and $R_4$ is a radical selected from the group consisting of hydrogen, alkyl, haloalkyl and hydroxyalkyl.

2. Hydroxyalkylcarbamylalkylphosphonates as set forth in claim 1 wherein $R_3$ is ethylene.

3. Hydroxyalkylcarbamylalkylphosphonates as set forth in claim 1 wherein $R_4$ is hydroxyalkyl.

4. Hydroxyalkylcarbamylalkylphosphonates of the formula as set forth in claim 1 wherein $R_1$ and $R_2$ are hydroxyalkyl radicals.

5. Diethyl bis-(hydroxyethyl)carbamylmethylphosphonate.

6. Diethyl bis-(hydroxyethyl)carbamylethylphosphonate.

7. Bis-(hydroxyethyl) bis-(hydroxyethyl)carbamylethylphosphonate.

* * * * *